United States Patent [19]

Tuttle

[11] Patent Number: 5,642,562

[45] Date of Patent: *Jul. 1, 1997

[54] METHOD OF FORMING BUTTON-TYPE BATTERY LITHIUM ELECTRODES WITH HOUSING MEMBER

[75] Inventor: Mark E. Tuttle, Boise, Id.

[73] Assignee: Micron Communications, Inc., Boise, Id.

[*] Notice: The term of this patent shall not extend beyond the expiration date of Pat. No. 5,542,959.

[21] Appl. No.: 660,034

[22] Filed: Jun. 6, 1996

Related U.S. Application Data

[60] Continuation of Ser. No. 538,985, Oct. 5, 1995, Pat. No. 5,542,959, which is a division of Ser. No. 271,012, Jul. 6, 1994, Pat. No. 5,480,462, which is a continuation-in-part of Ser. No. 205,611, Mar. 2, 1994, Pat. No. 5,547,781, and a continuation-in-part of Ser. No. 206,051, Mar. 2, 1994, Pat. No. 5,486,431.

[51] Int. Cl.⁶ ................................................. H01M 6/02
[52] U.S. Cl. ................................... 29/623.3; 29/623.1
[58] Field of Search .............................. 29/623.3, 623.1

[56] References Cited

U.S. PATENT DOCUMENTS

| | | | |
|---|---|---|---|
| 2,422,045 | 6/1947 | Ruben | 126/167 |
| 2,712,565 | 7/1955 | Williams, Jr. | 136/107 |
| 2,951,891 | 9/1960 | Kempf | 136/169 |
| 3,004,094 | 10/1961 | Haessly | 29/623.3 |
| 3,023,259 | 2/1962 | Coler et al. | 429/127 |
| 3,096,217 | 7/1963 | Clune | 136/107 |
| 3,185,595 | 5/1965 | Schenk, Jr. | 136/133 |
| 3,290,753 | 12/1966 | Chang | 427/272 |
| 3,440,110 | 4/1969 | Arbter | 136/166 |
| 3,457,117 | 7/1969 | Angelovich | 136/133 |
| 3,663,000 | 5/1972 | Ruetschi | 136/107 |
| 3,708,343 | 1/1973 | Walsh | 136/133 |
| 3,713,896 | 1/1973 | Feldhake | 136/133 |
| 3,799,959 | 3/1974 | Epstein | 260/429 |
| 3,891,462 | 6/1975 | Langkau | 136/111 |
| 3,935,026 | 1/1976 | Howard | 136/20 |
| 4,025,702 | 5/1977 | Nishimura et al. | 429/142 |
| 4,048,405 | 9/1977 | Megahed | 429/206 |
| 4,121,020 | 10/1978 | Epstein et al. | 429/162 |

(List continued on next page.)

OTHER PUBLICATIONS

"TC 580, Heat Curable, Peelable Temporary Solder Mask", *Technical Data Sheet* Techform Laboratories, Orange, California (no date).

*Primary Examiner*—John S. Maples
*Attorney, Agent, or Firm*—Wells, St. John, Roberts Gregory & Matkin, P.S.

[57] ABSTRACT

A method of forming a button-type lithium electrode includes: a) masking an electrically conductive sheet with a material to which elemental lithium will not appreciably adhere to define a masked portion and an unmasked portion, the unmasked portion being in the shape of the desired electrode being formed; c) applying molten lithium to the masked sheet to cause elemental lithium to adhere to the unmasked portion but not appreciably adhere to the masked portion; alternately, directing a lithium stream onto the sheet; d) solidifying the lithium on the unmasked portion to in situ form a lithium electrode; and e) after solidifying, removing the masking material from the masked portion of the sheet. An alternate method includes: a) providing a release liner sheet having elemental lithium adhered thereto in the form of a series of discrete patterns having a size and shape of the lithium electrodes being formed; b) providing an electrically conductive sheet having an exposed surface which is divisible into a plurality of areas; c) laminating the release liner sheet with the conductive sheet to adhere the series of discrete elemental lithium patterns onto the respective sheet areas; d) pulling the release liner sheet from the conductive sheet and discrete lithium patterns, leaving the discrete lithium patterns adhering to the conductive sheet; and e) cutting and forming a plurality of discrete battery terminal housing members from the areas of the sheet, with each of the discrete battery terminal housings bearing one of the discrete lithium patterns.

4 Claims, 5 Drawing Sheets

U.S. PATENT DOCUMENTS

| | | | |
|---|---|---|---|
| 4,122,241 | 10/1978 | Ciliberti, Jr. et al. | 429/133 |
| 4,263,380 | 4/1981 | Riedl | 429/162 |
| 4,374,909 | 2/1983 | Tucholski | 429/174 |
| 4,409,730 | 10/1983 | Goebel | 29/623.5 |
| 4,537,647 | 8/1985 | Foster | 427/282 |
| 4,632,887 | 12/1986 | Jung | 429/181 |
| 5,401,805 | 3/1995 | Yasuda et al. | 429/174 |
| 5,432,027 | 7/1995 | Tuttle et al. | 429/127 |
| 5,542,959 | 8/1996 | Tuttle | 29/623.3 |

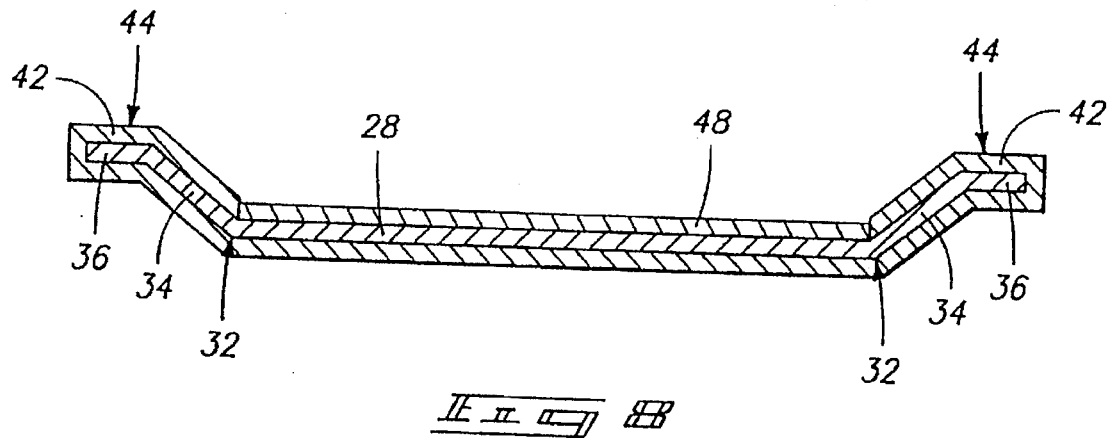
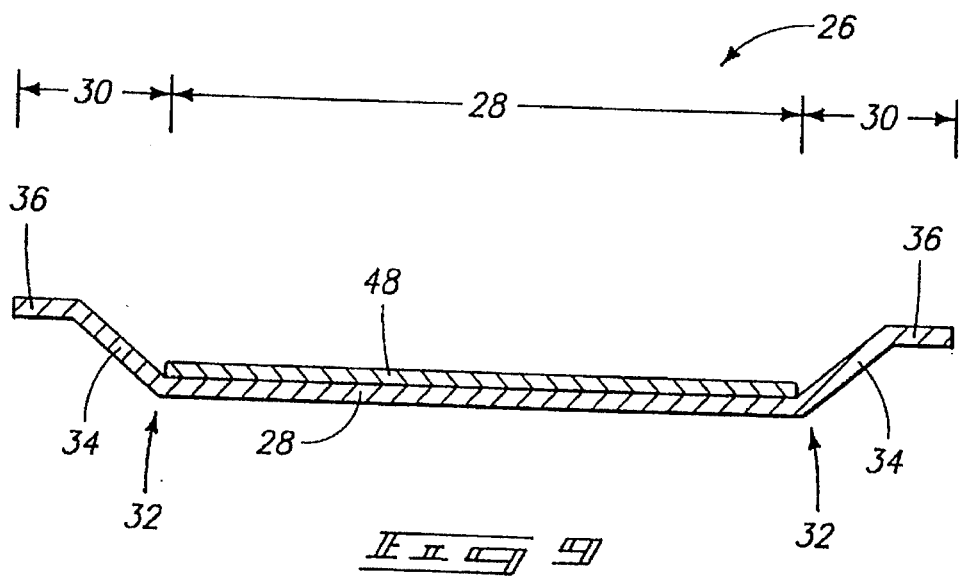
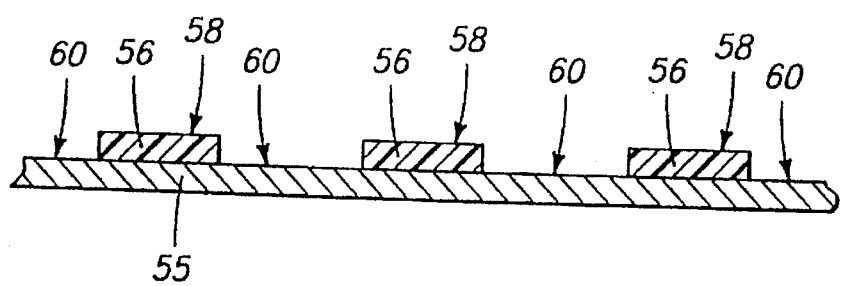

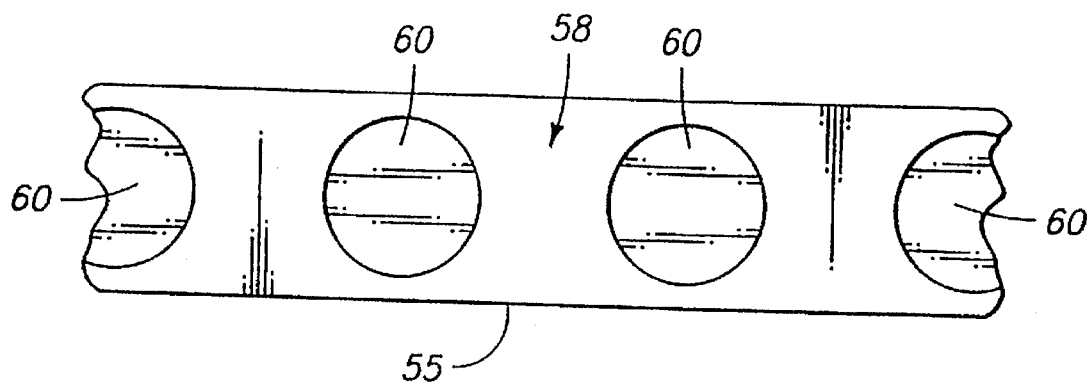
_FIG. 11_
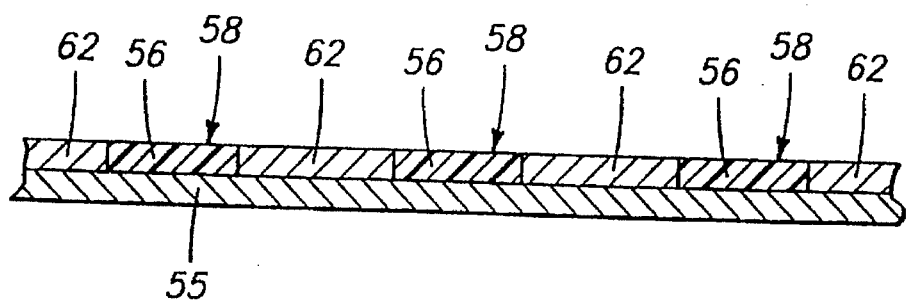
_FIG. 12_
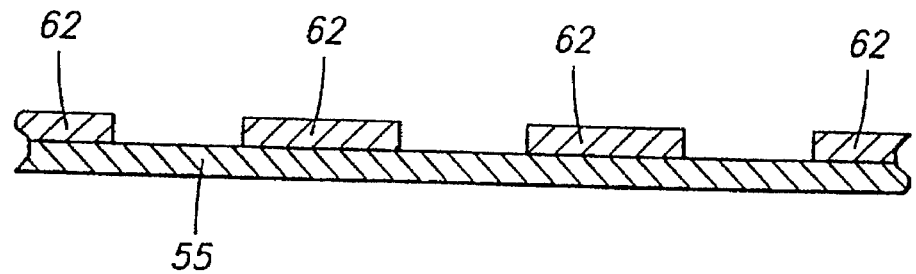
_FIG. 13_

METHOD OF FORMING BUTTON-TYPE BATTERY LITHIUM ELECTRODES WITH HOUSING MEMBER

This application is a Continuation of Ser. No. 08/538,985, filed Oct. 5, 1995, now U.S. Pat. No. 5,542,959 which is a Division of Ser. No. 08/271,012, filed Jul. 6, 1994, now U.S. Pat. No. 5,480,462, which is a continuation-in-part of each of Ser. No. 08/205,611, filed Mar. 2, 1994, now U.S. Pat. No. 5,547,781, Ser. No. 08/205,957, filed Mar. 2, 1994, now U.S. Pat. No. 5,432,027 and Ser. No. 08/206,051, filed Mar. 2, 1994, now U.S. Pat. No. 5,486,431.

TECHNICAL FIELD

This invention relates to forming button-type battery lithium electrodes.

BACKGROUND OF THE INVENTION

Button-type batteries are small, thin energy cells that are commonly used in watches and other electronic devices requiring a thin profile. A conventional button-type battery includes two electrodes in the form of an anode and a cathode. These are separated by a porous separator. An electrolyte is present within pores of the separator.

These internal battery components are housed within a metal casing or housing formed by a lower conductive can and an upper conductive lid. A common prior art material for the can and lid is stainless steel. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically isolate the two housing members.

Typically, the can and lid are separately pre-formed with the anode and cathode materials being inserted after housing formation. One electrode material is elemental lithium, which is typically utilized within the lid as the anode electrode. The typical anode assembly method comprises placing a piece of lithium, already in its finished anode shape, to within the center of a pre-formed lid. The lithium adheres to the lid material, and the lid/lithium composite can then be easily moved in juxtaposition to the cathode can without dislodging the lithium. However, one difficulty with this method concerns handling of the elemental lithium. In short, lithium is sticky and adheres to most everything with which it comes into contact. This makes it extremely difficult for the assembler to appropriately and precisely position the lithium within the lid without it sticking to the insertion tool and other objects.

It would be desirable to develop improved methods of forming button-type lithium electrodes.

BRIEF DESCRIPTION OF THE DRAWINGS

Preferred embodiments of the invention are described below with reference to the following accompanying drawings.

FIG. 8 is a view of the FIG. 7 sheet shown at a processing step subsequent to that shown by FIG. 7.

FIG. 9 is a diagrammatic side cross-sectional view of a finished lithium electrode in accordance with the invention.

FIG. 10 is a side cross-sectional view of another alternate electrically conductive sheet at a processing step in another alternate method of forming a button-type lithium electrode in accordance with the invention.

FIG. 11 is a top view of FIG. 10.

FIG. 12 is a view of the FIG. 10 sheet shown at a processing step subsequent to that shown by FIG. 10.

FIG. 13 is a view of the FIG. 10 sheet shown at a processing step subsequent to that shown by FIG. 12.

DETAILED DESCRIPTION OF THE PREFERRED EMBODIMENTS

Figure 1:
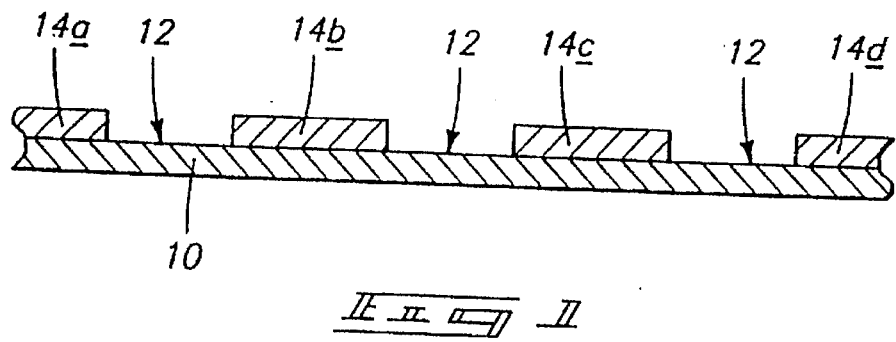
FIG. 1 is a diagrammatic side cross-sectional view of a release liner sheet at one processing step in a method of forming a button-type lithium electrode in accordance with an aspect of the invention.

This disclosure of the invention is submitted in furtherance of the constitutional purposes of the U.S. Patent Laws "to promote the progress of science and useful arts" (Article 1, Section 8).

This invention concerns "coin" or "button-type" batteries, and their components. A button-type battery is typically a small, circular-shaped energy cell approximately the size of a coin. The button-type battery can be constructed in different sizes, with typical diameters being 12 mm, 16 mm, and 20 mm. Other shapes are possible, but the circular shape is most common.

In accordance with one aspect of the invention, a method of forming a button-type lithium electrode comprises the following steps:

providing an electrically conductive sheet having an exposed surface, the electrically conductive sheet being comprised of a material to which elemental lithium will adhere;

masking the electrically conductive sheet with a material to which elemental lithium will not appreciably adhere, the masking defining a masked portion and an unmasked portion, the unmasked portion of the conductive sheet having a cross-sectional size and shape of the desired electrode being formed;

applying molten lithium to the masked electrically conductive sheet to cause elemental lithium to adhere to the unmasked portion but not appreciably adhere to the masked portion;

solidifying the elemental lithium on the unmasked portion to in situ form a lithium electrode on the unmasked portion; and after solidifying, removing the masking material from the masked portion of the conductive sheet.

In accordance with another aspect of the invention, a method of forming a plurality of button-type lithium electrodes comprises the following steps:

providing an electrically conductive sheet having an exposed surface, the electrically conductive sheet being comprised of a material to which elemental lithium will adhere;

masking the electrically conductive sheet with a material to which elemental lithium will not appreciably adhere, the masking defining a masked portion and an unmasked portion, the unmasked portion of the conductive sheet having a cross-sectional size and shape of the desired electrode being formed;

providing and directing a lithium stream onto the electrically conductive sheet to cause elemental lithium to adhere to the unmasked portion but not appreciably adhere to the masked portion; and solidifying the lithium stream on the unmasked portion to in situ form a lithium electrode.

In accordance with still another aspect of the invention, a method of forming a plurality of button-type lithium electrodes comprises the following steps:

providing a release liner sheet having elemental lithium adhered thereto, the adhered elemental lithium being in the form of a series of discrete patterns having a size and shape of the lithium electrodes being formed;

providing an electrically conductive sheet having an exposed surface, the exposed surface being divisible into a plurality of areas;

laminating the release liner sheet with the electrically conductive sheet to adhere the series of discrete elemental lithium patterns onto the respective sheet areas;

pulling the release liner sheet from the electrically conductive sheet and discrete lithium patterns, leaving the discrete lithium patterns adhering to the electrically conductive sheet; and cutting and forming a plurality of discrete battery terminal housing members from the areas of the electrically conductive sheet, with each of the discrete battery terminal housings bearing one of the discrete lithium patterns.

Figure 2:
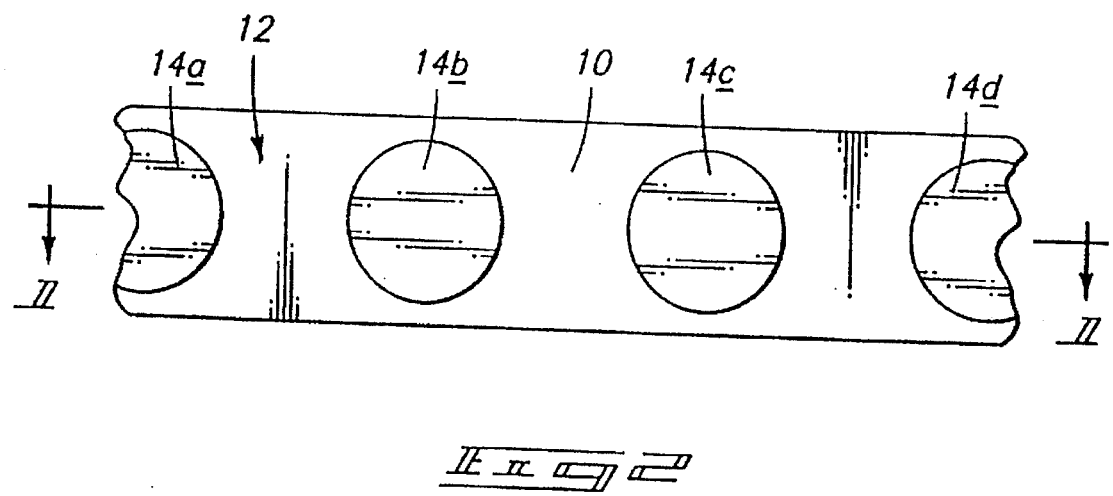
FIG. 2 is a top view of FIG. 1.

The discussion proceeds first with respect to FIGS. 1–6 with the description of one preferred embodiment of the invention. Referring first to FIGS. 1–2, there illustrated is a release liner sheet 10 (polypropylene being an example) having an exposed surface 12. An example thickness of sheet 10 is 3 mils. Sheet 10 has elemental lithium adhered thereto in the form of a series of discrete patterns 14a, 14b, 14c, and 14d (collectively referred to as patterns 14) which each has a size and shape of the resultant lithium electrodes being formed.

Figure 3:
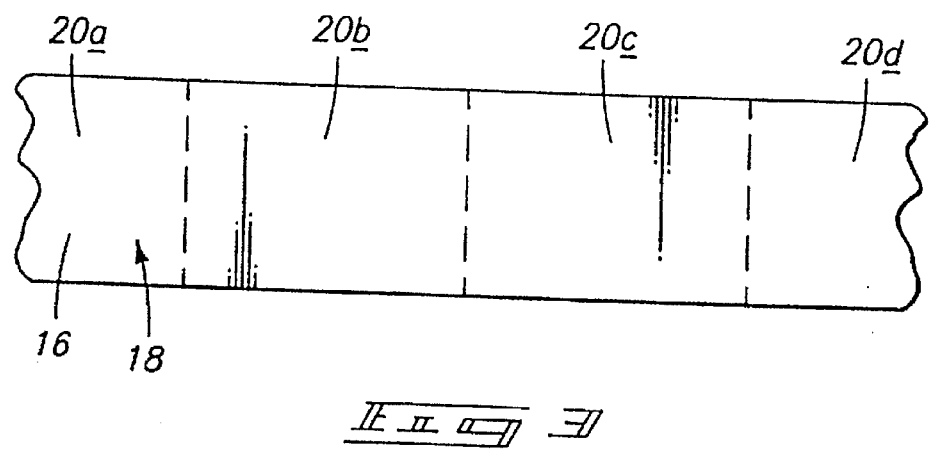
FIG. 3 is a diagrammatic top view of an electrically conductive sheet at one processing step in a method of forming a button-type lithium electrode in accordance with an aspect of the invention.

Referring to FIG. 3, an electrically conductive sheet 16 in the form of an elongated continuous strip is provided. Conductive sheet 16 is comprised of a material to which elemental lithium will adhere, with 304 stainless steel being a preferred example. An example thickness is 6 mils. Sheet 16 includes an exposed surface 18 which is divisible into a plurality of areas 20a, 20b, 20c, and 20d (collectively referred to as areas 20). Sheet 16 constitutes the material from which a series of discrete battery terminal housing members will be cut and formed for retaining the button-type lithium electrodes.

Figure 4:
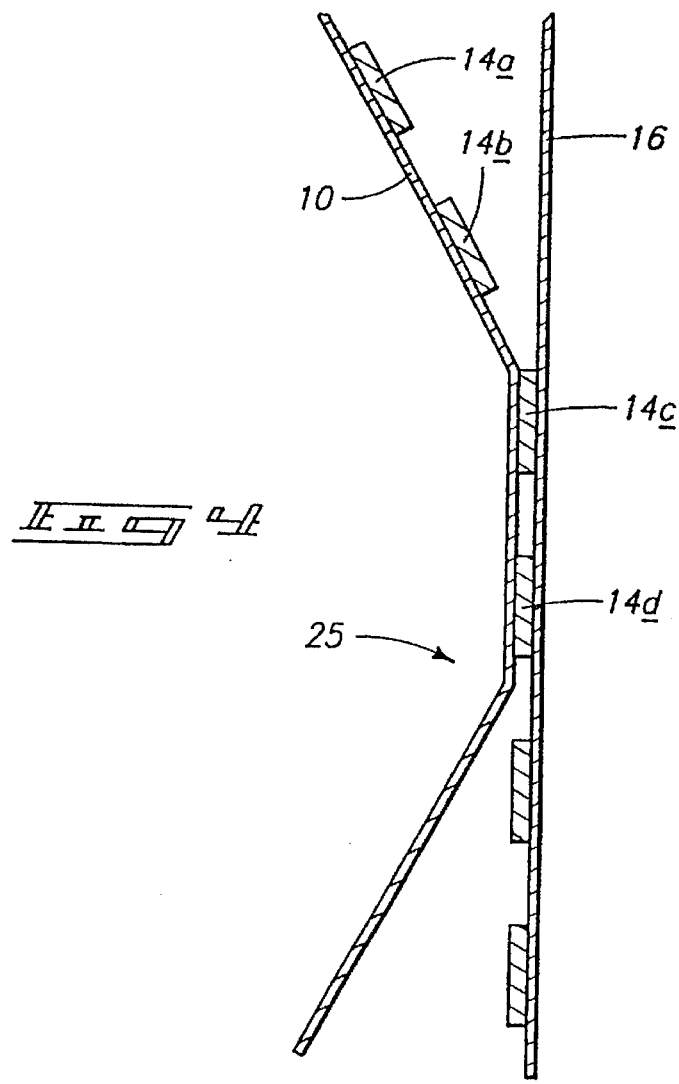
FIG. 4 is a diagrammatic side sectional view of a laminating operation in accordance with an aspect of the invention.

Referring to FIG. 4, release liner sheet 10 is laminated with sheet 16 to adhere the series of discrete elemental lithium patterns 14 onto the respective sheet areas 20. Release liner sheet 10 is thereafter pulled away at location 25 from electrically conductive sheet 16 and discrete lithium patterns 14, with the discrete lithium patterns 14 adhering to sheet 16. Thereafter, sheet 16 is cut and formed into a plurality of discrete terminal housing members from areas 20, with each of the discrete battery terminal housings bearing one of the discrete lithium patterns 14.

Figure 5:
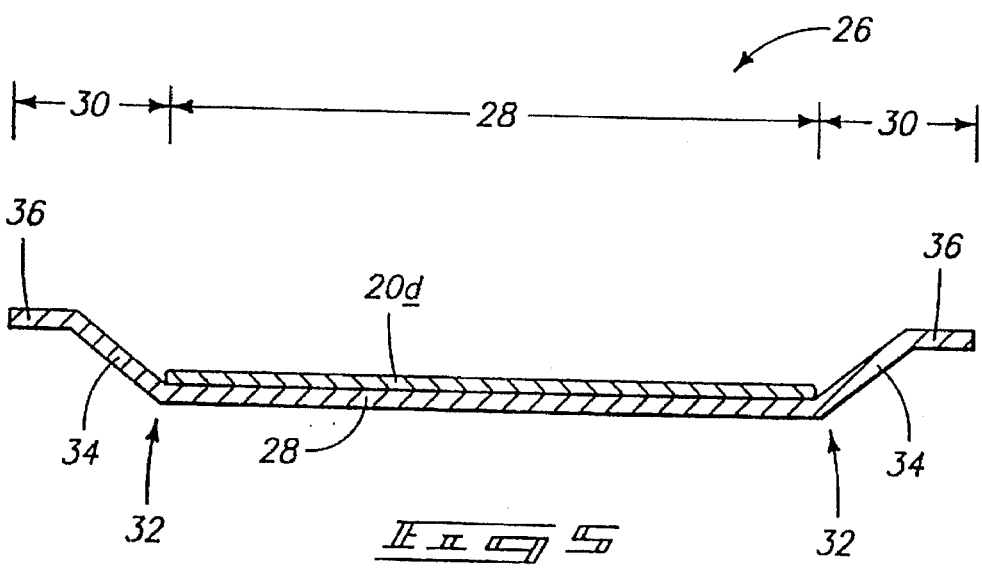
FIG. 5 is a side cross-sectional view of a finished lithium electrode in accordance with the invention.
Figure 6:
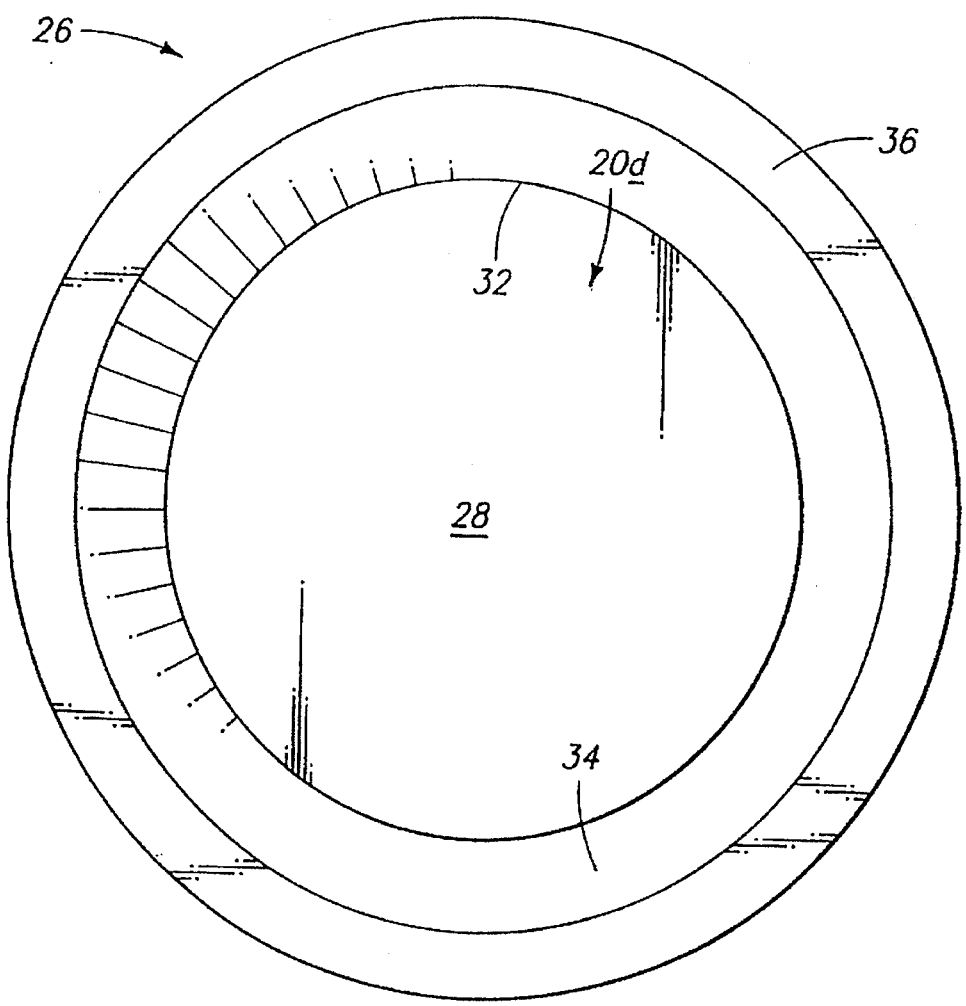
FIG. 6 is a top view of FIG. 5.

An example finished construction is shown in FIGS. 5 and 6. Such comprises a battery terminal housing member 26 comprised of a central portion 28 and an annular surrounding peripheral portion 30. Peripheral portion 30 angles away from central portion 28 at a continuous circle, peripheral angle 32. Accordingly, angle 32 defines a cross-sectional shape and periphery for central portion 28. Peripheral portion 30 includes an angling section 34 and a upper flat, horizontal portion 36. Angling portion 34 defines an internal receptacle volume, while annular portion 36 is utilized for joining with a corresponding juxtaposed section (not shown) of the can portion of the button-type battery. Materials of the tooling utilized to bend or form sheet sections 20 into housing 26 which might come into contact are preferably composed of or coated with a material to which lithium will not adhere. An example material is Delrin™, available from DuPont.

Figure 7:
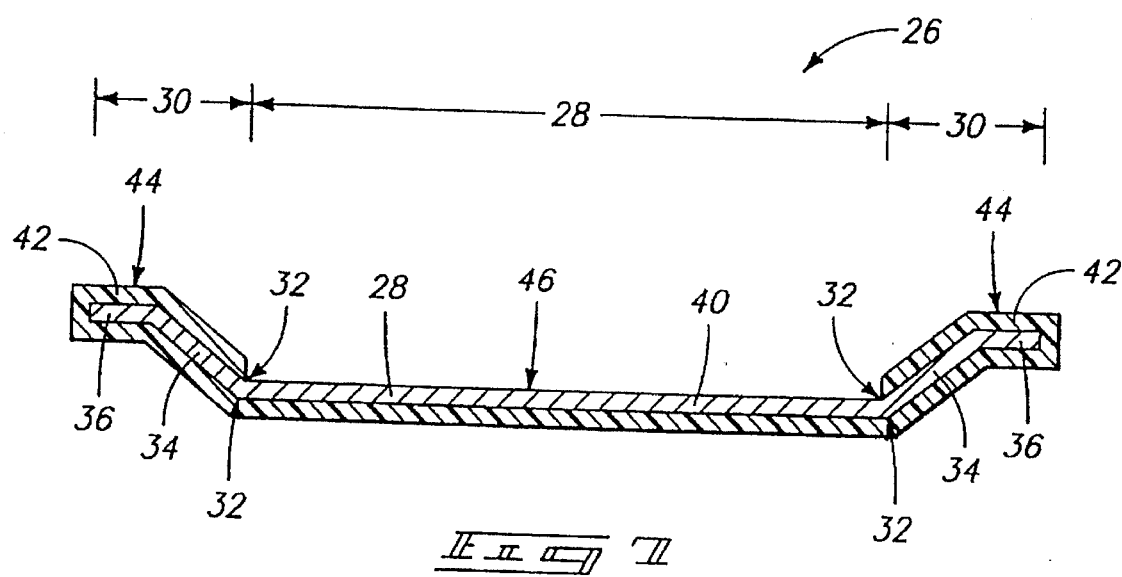
FIG. 7 is a diagrammatic side cross-sectional view of an alternate electrically conductive sheet at a processing step in an alternate method of forming a button-type lithium electrode in accordance with the invention.

Another alternate method in accordance with the invention is described with reference to FIGS. 7–9. FIG. 7 illustrates an electrically conductive sheet 40 which essentially constitutes the formed battery terminal housing member 26 of FIG. 5, less the lithium. Like numbers of construction from FIG. 5 for receptacle 26 formed by sheet 40 are utilized where appropriate. Thus, the stated electrically conductive sheet in this described embodiment is in the form of a pre-formed electrically conductive terminal housing member. Such is comprised of a material to which elemental lithium will adhere, with 304 stainless steel being but one example.

Pre-formed sheet 40 is masked with a masking material 42 which is comprised of a substance to which elemental lithium will not appreciably adhere. An example and preferred masking material is TC 580™ available from Techform Laboratories of Orange, Calif. Masking material 42 defines a masked portion 44 where material of sheet 40 is covered, and an unmasked portion 46 where masking material 42 does not cover sheet 40. Unmasked portion 46 has a cross-sectional size and shape of the desired lithium electrode being formed. Accordingly, the masked portion 44 comprises peripheral portion 30, as well as the back portion of sheet 40. In the illustrated and preferred embodiment, masked portion 44 at least covers all of the internal peripheral portion 30 such that only and all of central portion 28 within housing 26 is exposed.

Referring to FIG. 8, masked sheet 40 is dipped into molten elemental lithium to cause a film 48 of elemental lithium to adhere to unmasked portion 46, but not appreciably adhere to masked portion 44. Typically and preferably, sheet 40 is at a temperature below the melting temperature of lithium (180.54° C.) prior to its dipping into the molten lithium to facilitate lithium adherence to the unmasked portion. Thereafter, the sheet is removed from the molten lithium such that the temperature of film 48 falls to below the melting temperature of elemental lithium. This solidifies film 48 on unmasked portion 46 to in situ form a lithium electrode in the form of layer 48. After solidifying, the masking material is simply removed from masked portion 44 of sheet 40 to leave the finished construction of FIG. 9, which is essentially identical to the construction of first embodiment FIG. 5.

The above-described embodiment provides but one example where an electrically conductive sheet is pre-formed prior to the masking and applying steps. An alternate embodiment where masking and applying occur prior to the housing bending/forming steps is described below with reference to FIGS. 10–13. Referring first to FIGS. 10 and 11, an electrically conductive sheet in the form of a continuous strip of 304 stainless steel is indicated generally by reference numeral 55. Such is masked with the same masking material 56 to which elemental lithium will not appreciably adhere. The masking material 56 atop sheet 55 defines masked portions 58 and unmasked portions or holes 60. Holes 60 are of the same cross-sectional size and shape of the desired electrodes to be formed. Thus, FIGS. 10 and 11 represent a negative image of the embodiment shown by FIGS. 1 and 2.

Referring to FIG. 12, strip 55 is dipped or passed over a wave of molten elemental lithium (a process analogous to wave soldering of printed circuit boards) to cause unmasked regions or holes 60 to be filled with elemental lithium blocks 62. Such solidify when the temperature is lowered below lithium's melting point. Thereafter, masking material 56 is removed from sheet 55, producing the construction shown by FIG. 13. FIG. 13 is identical to the sheet shown by FIG. 1. Subsequently, sheet 55 is cut and formed into a plurality of discrete battery terminal housing members.

The above examples describe processes wherein dipping into a molten bath of elemental lithium is the method by which lithium is provided to the unmasked portions. Alternately in accordance with the invention, an elemental lithium stream could be provided and directed onto the electrically conductive sheet for causing the lithium to adhere to the unmasked portions. By way of example only and not of limitation, one technique would be to direct a stream of liquid lithium against the conductive sheet.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of forming a plurality of discrete battery terminal housing members comprising the following steps:

providing a release liner sheet having elemental lithium adhered thereto, the adhered elemental lithium being in the form of a series of discrete patterns having a size and shape of the lithium electrodes being formed;

providing an electrically conductive sheet having an exposed surface, the exposed surface being divisible into a plurality of areas;

laminating the release liner sheet with the electrically conductive sheet to adhere the series of discrete elemental lithium patterns onto the respective sheet areas;

pulling the release liner sheet from the electrically conductive sheet and discrete lithium patterns, leaving the discrete lithium patterns adhering to the electrically conductive sheet; and cutting and forming a plurality of discrete battery terminal housing members from the areas of the electrically conductive sheet, with each of the discrete battery terminal housings bearing one of the discrete lithium patterns.

2. A method of forming a plurality of discrete battery terminal housing members comprising transferring preformed lithium electrodes which are adhered on a liner sheet to a conductive sheet, and thereafter cutting and forming the conductive sheet into a plurality of discrete battery terminal housing members comprising the preformed lithium electrodes.

3. The method of claim 2, wherein individual preformed lithium electrodes have respective maximum linear dimensions which are greater than respective electrode thicknesses.

4. The method of claim 2, wherein individual preformed lithium electrodes have respective maximum linear dimensions which are greater than respective electrode thicknesses, and further comprising joining individual discrete battery terminal housing members with other battery terminal housing members to define a plurality of thin profile batteries, respective joined battery terminal housing members having oppositely facing outer surfaces separated from one another by a distance which is less than the maximum linear dimension of the lithium electrode.

* * * * *

UNITED STATES PATENT AND TRADEMARK OFFICE
CERTIFICATE OF CORRECTION

PATENT NO. : 5,642,562

DATED : July 1, 1997

INVENTOR(S) : Mark E. Tuttle

It is certified that error appears in the above-identified patent and that said Letters Patent are hereby corrected as shown below:

Page 1, line 54, in the Title, --Method<u>s</u> of Forming [Button-Type] <u>Discrete</u> Battery [Lithium Electrodes with] <u>Terminal</u> Housing Member<u>s</u>--.

Column 1, line 1, in the Title, --Method<u>s</u> of Forming [Button-Type] <u>Discrete</u> Battery [Lithium Electrodes with] <u>Terminal</u> Housing Member<u>s</u>--.

Page 1, line 60, Related U.S. Application Data, --Continuation of Ser. No. 538,985, Oct. 5, 1995, Pat. No. 5,542,959, which is a division of Ser. No. 271,012, Jul. 6, 1994, Pat No. 5,480,462, which is a continuation-in-part of Ser. No. 205,611, Mar. 2, 1994, Pat. No. 5,547,781, and a continuation-in-part of Ser. No. 206,051, Mar. 2, 1994, Pat. No. 5,486,431[.]<u>, and a continuation-in-part of Ser. No. 08/205,957, Mar. 2, 1994, Pat. No. 5,432,027.</u>--

Signed and Sealed this

Twenty-fifth Day of November, 1997

Attest:

BRUCE LEHMAN

Attesting Officer

Commissioner of Patents and Trademarks